(12) United States Patent
Housel

(10) Patent No.: US 7,095,526 B1
(45) Date of Patent: Aug. 22, 2006

(54) AUTOMATIC LAYOUT METHOD FOR FULL-BLEED PRINTING

(75) Inventor: Edward M. Housel, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 864 days.

(21) Appl. No.: 09/691,332

(22) Filed: Oct. 18, 2000

(51) Int. Cl.
*G06F 15/00* (2006.01)
*H04N 1/21* (2006.01)
*G03G 15/00* (2006.01)

(52) U.S. Cl. ............... 358/1.18; 358/1.6; 358/1.12; 358/296; 358/304; 399/407

(58) Field of Classification Search ........... 358/1.18, 358/1.6, 1.12, 1.13, 296, 304; 399/407
See application file for complete search history.

(56) References Cited

U.S. PATENT DOCUMENTS

| | | | |
|---|---|---|---|
| 5,040,079 A * | 8/1991 | Shimizu | 358/451 |
| 5,129,639 A | 7/1992 | DeHority | |
| 5,223,939 A | 6/1993 | Imaizumi et al. | |
| 5,461,459 A * | 10/1995 | Muramatsu et al. | 399/15 |
| 5,631,747 A | 5/1997 | Farrell et al. | |
| 5,651,618 A | 7/1997 | Tamiya | |
| 5,984,446 A * | 11/1999 | Silverbrook | 347/3 |
| 6,118,467 A | 9/2000 | Park | |
| 6,414,755 B1 * | 7/2002 | Bronstein et al. | 358/1.15 |
| 6,469,770 B1 * | 10/2002 | Hoshino et al. | 355/40 |
| 6,549,295 B1 * | 4/2003 | Fantone et al. | 358/1.14 |
| 6,765,691 B1 * | 7/2004 | Kubo et al. | 358/1.9 |
| 6,771,384 B1 * | 8/2004 | Laverty et al. | 358/1.15 |

FOREIGN PATENT DOCUMENTS

| | | |
|---|---|---|
| EP | 0 478 970 A2 | 4/1992 |
| EP | 0 889 637 A2 | 1/1999 |
| EP | 0 913 265 A2 | 5/1999 |
| JP | 5-293794 | 11/1993 |
| JP | 11-170676 | 6/1999 |
| WO | WO 96/32725 * | 10/1996 |

OTHER PUBLICATIONS

EP Search Report EP 01 12 3394.
C.J. Bell, "Means to Maximize Printed Area in Ink Jet Printers", P-71, Xerox Disclosure Journal-vol. 25, No. 2 Mar./Apr. 2001.
Patent Abstracts of Japan 11170676.
Patent Abstracts of Japan 05293794.

* cited by examiner

*Primary Examiner*—Edward Coles
*Assistant Examiner*—Chan S. Park

(57) ABSTRACT

The invention is an improved method of automatically laying out a print job to be printed on a printer having a multiplicity of available media sizes. The method utilizes the ability of the printer to print full-bleed on at least some of the four edges of the paper media, and includes automatically performing the calculations to determine the appropriate shift in the location of the print area on the paper media, as well as determining whether the print area must be rotated to obtain the best fit to the media, thereby minimizing the amount of post-printing trimming required. The invention is useful in simplex and duplex printing.

15 Claims, 5 Drawing Sheets

AUTOMATIC LAYOUT METHOD FOR FULL-BLEED PRINTING

BACKGROUND OF THE INVENTION

1. Field of the Invention

This invention relates to a method of automatically performing the calculations usually performed by the printer operator in laying out a print job so as to optimize the location of the printed image on the paper media, for example minimizing the amount of trimming required after printing on media larger than the desired final size. More particularly, the invention relates to automatically laying out the image size and location on the page so that, even in duplex printing, the amount of post-printing handling, such as trimming, is minimized.

2. Brief Description of the Related Art

The invention relates to apparatus and methods for production of printed images on paper media. For the sake of clarity, the four edges of such paper media may be referred to herein as the leading edge, the trailing edge and two lateral edges, in reference to the direction of travel through the printer. The printed output is referred to in terms of a print area, defined by a length and width of the finished printed product, after post-printing trimming.

Many digital printers and copiers are capable of producing a finished product having the appearance of documents produced using ink-based, offset printing techniques. Such output includes brochures and the like, where the customer desires that the entire page be printed, with no unprinted margins or edges. One option for producing such documents is to print on oversize media and trim the four unprinted edges off the printed output to yield the finished product. This method produces an acceptable product and, indeed, may be requested by some customers. However, it introduces an additional production step, requiring an operator to setup a post-printing trimming device and trim the printed output to desired dimensions of the final product. In addition to increasing labor costs and production time, the additional operator intervention required introduces the possibility of operator error, resulting in expensive wasted print runs.

In setting up a print job that will be trimmed after printing, the operator is required to calculate a layout that will center the image, resulting in the same margin on the leading edge and trailing edge, on both the front and back sides of the page, followed by trimming to remove the portion outside the margin on both edges. Additional problems arise when the operator is required to print on odd-size media, for example 7" by 9" rather than 8½" by 11" media. This situation is especially problematic when the job must be printed on larger media than the customer wants delivered as the finished product. In this situation, the operator is required to perform sophisticated layout work, manually calculating the image shift required to place the image in the appropriate position on the media. In the case of simplex (single-sided) copying, the operator is required to shift the image only past any enforced printer margin, for example, a ⅒" enforced margin on the leading edge of the page, followed by appropriate trimming on all four edges to yield that finished product. In duplex (two-sided) printing, however, the image must be shifted so that the image on the first side of the page and the image on the second side of the page coincide in the same area, so that none of the image on either side is lost in trimming. For example, in the case of printing a 7"×9" image on 8.5"×11" paper, the calculations would involve shifting the image from each edge, i.e., by shifting the x-origin by (8.5−7)/2 inches and the y-origin by (11−9)/2 inches. The printed output must then be trimmed to remove the portion of the paper outside these shift values. Therefore, the calculations involved in such layout work must be preserved, written down and sent to the person performing the trimming, along with the finished printing output. The trimming operator must then replicate the calculations exactly in setting up the trimming device, or the finished copy output will be trimmed incorrectly, ruining the entire print job. Each of the steps in the layout process and the setup operations on the trimming device are time-consuming, labor-intensive and are potential sources of operator error.

Many high-end printers and copiers can be enabled to print "full bleed," that is, they may be setup to print to the very edge of the paper medium. However, because of quality concerns, many electrophotographic marking engines do not allow full bleed printing on all four edges of the medium. These quality concerns relate mainly to the retention of toner on the leading edge of the media. Prior to fusing, the toner is held in association with the paper by electrostatic forces. However, the toner does not bind as well at the edges of the media, particularly because it is more susceptible to being shaken off the paper when the leading edge is contacted by the fuser nip rollers and, therefore when the leading edge enters the fuser nip rollers, the leading edge of the page is particularly susceptible to smearing or other problems resulting in poor print quality. Therefore, in order to avoid such problems, many printers only allow full-bleed printing on the trailing and lateral edges, with an enforced printer margin on the leading edge. However, in duplex printing, the leading edge of the first side of the page does not coincide with the leading edge of the second or reverse side of the page. In fact, the leading edge of the first side of the page becomes the trailing edge of the second side of the page. This makes it impossible to simply print to the limit of the enforced margin on the leading edge on both sides and trim the finished product, as the trimming will remove a portion of the image on each side of the page.

By taking advantage of the ability of such printers to print to the very edge of the page, it is possible to locate the print area on the page such that post-printing trimming is minimized. In some instances, this may require no more than centering the image between the leading and trailing edges with full-bleed printing on the lateral edges, necessitating trimming of only two sides. Such an approach is equally useful in single-sided and double-sided printing. Alternatively, in single-sided printing, it may be possible to print full-bleed on the trailing and lateral edges, trimming only the leading edge.

Additionally, one may use the different size media available, selecting the media on which the print area fits optimally. By taking advantage of the ability of the printer to print full bleed, in conjunction with the ability to shift and rotate the image, it is possible to optimize the location of the image on the page. As used herein, optimizing the location of the image on the page includes minimizing post-printing trimming, as well as other beneficial results of the invention, such as allowing processing of print jobs on available media by manipulating the location of the image on the page.

Therefore, in view of these disadvantages of the prior art and current practices there is a need in the art for a printer that takes advantage of the full-bleed printing capability of current printers and automatically performs the necessary layout calculations. Therefore, it is an object of the present invention to take advantage of the ability of such printers to print to the very edge of the page, locating the print area on the page such that post-printing trimming is minimized.

It is an additional object of the invention to use the different size media available, selecting the media on which the print area its optimally, for example by rotating the print area if necessary and locating the print area so as to minimize post-printing trimming.

These and other objects and advantages of the invention are illustrated and clarified by the following detailed description of preferred embodiments of the invention, with appropriate reference to the figures described below.

SUMMARY OF THE INVENTION

In a preferred embodiment, the invention is a method of automatically laying out a print job for printing on a printer having a plurality of available media sizes, wherein the print job includes a designated print area, defined by the designated length and width of the finished printed output, the method including the steps of setting up the print job, where the print job includes data to designate the length and width of the finished printed output, determining whether the print area is smaller than an available media size and enabling the printer to print full-bleed. Then the system determines whether the print area must be rotated to fit the print area on an available media size and automatically calculates the distance and direction in which the print area must be shifted to locate the print area on the media in such a manner as to minimize post-printing trimming. Finally, the print job is printed with the calculated image area shift and image area rotation.

In one embodiment of the invention, the method is used to layout a single-sided print job, while in another embodiment, the method is used to layout a double-sided print job. Additionally, in yet another embodiment, the method includes the additional step of printing an instruction sheet accompanying the print job that lists instructions for setting up a post-printing trimming device to perform the necessary trimming operations.

DETAILED DESCRIPTION OF THE DRAWINGS AND PREFERRED EMBODIMENTS

Figure 1:
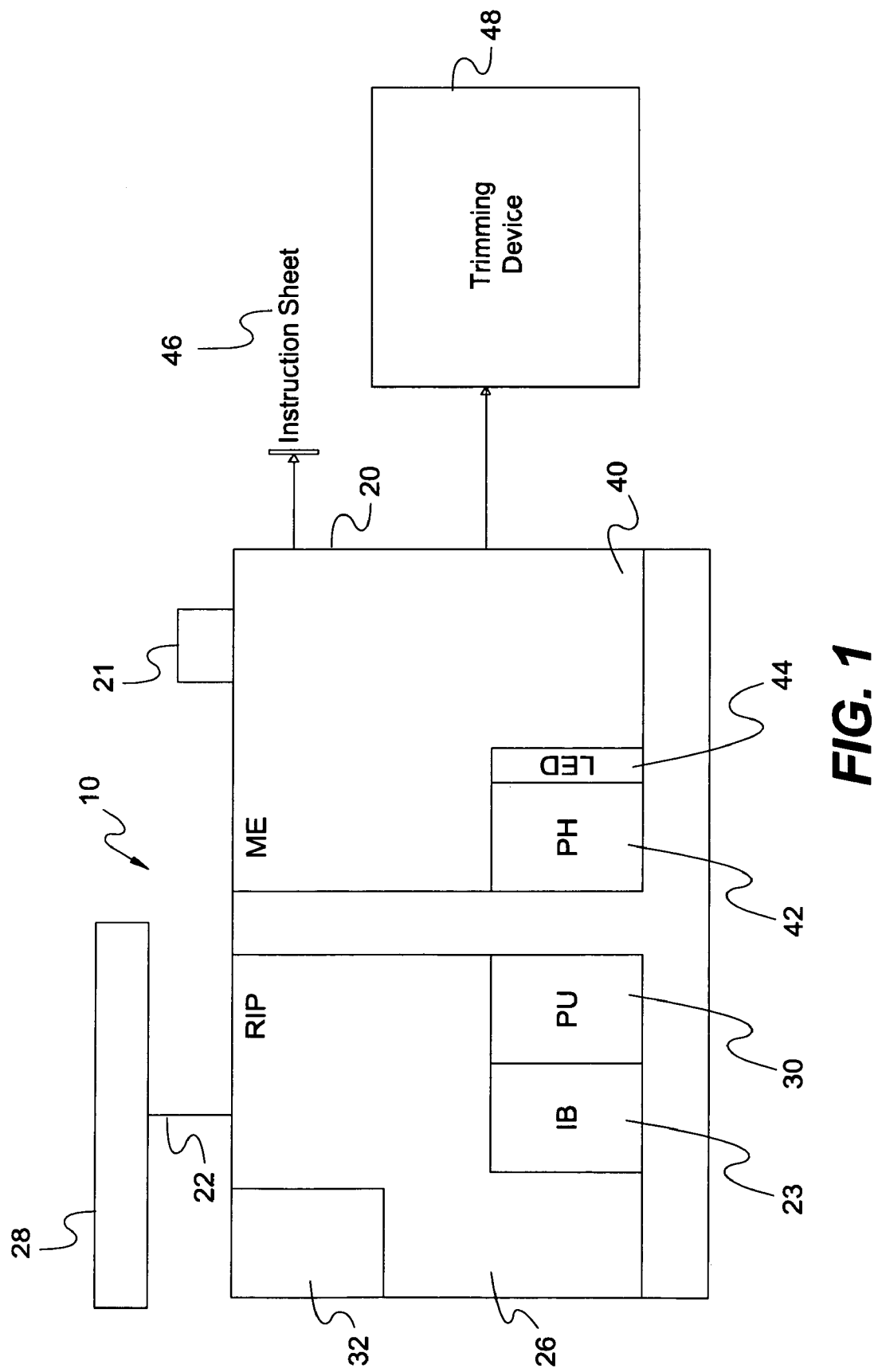
FIG. 1 is a diagrammatic representation of the architecture of a print system employing the present invention.

Referring to FIG. 1, a typical print system 10 of the type employing the present invention includes a printer 20 having a user interface 21 and network interface 22 connecting the printer 20 to a network 28. While the exemplary print system 10 shown is a network printing system intended to receive remote input through a network connection, other configurations are contemplated and possible within the scope of the present invention. For example, the printing system could be a stand alone printer, including a scanner for on-site image input. Additionally, the printer could be connected to a scan workstation, with the calculated layout displayed for operator approval upstream of the printer. While a particular printer configuration is discussed herein, it is to be understood that the present invention may be incorporated in other printing system configurations.

The printer 20 includes a raster image processor 26 that receives incoming data from the network 28. The raster image processor 26 includes processing unit 30, that receives control commands and data from the network 28. Control commands are translated into machine control language by the processing unit 30, while incoming print jobs and program codes are stored in a print job buffer 32.

The printer 20 also includes a marking engine 40, that incorporates a plurality of available media supplies, and other standard paper handling and processing equipment necessary, for example, for producing printed images on output paper. The marking engine 40 receives and stores in a multiple page image buffer 23, a data stream, including image data and control data generated by the processing unit 30. The image data is processed and transmitted to a print head 42 for transfer to the output pages. In a preferred embodiment, the print head is equipped with a plurality of light emitting diodes 44 (LEDs) that act as the print head light source. When a print job is sent to the marking engine 40, control commands issuing from the raster image processor 26 specify a subset of the LEDs 44 that emit light. By disabling LEDs 44 outside a certain limit, the print head control commands delineate the outer boundaries and parameters of the printed image.

Figure 2A:
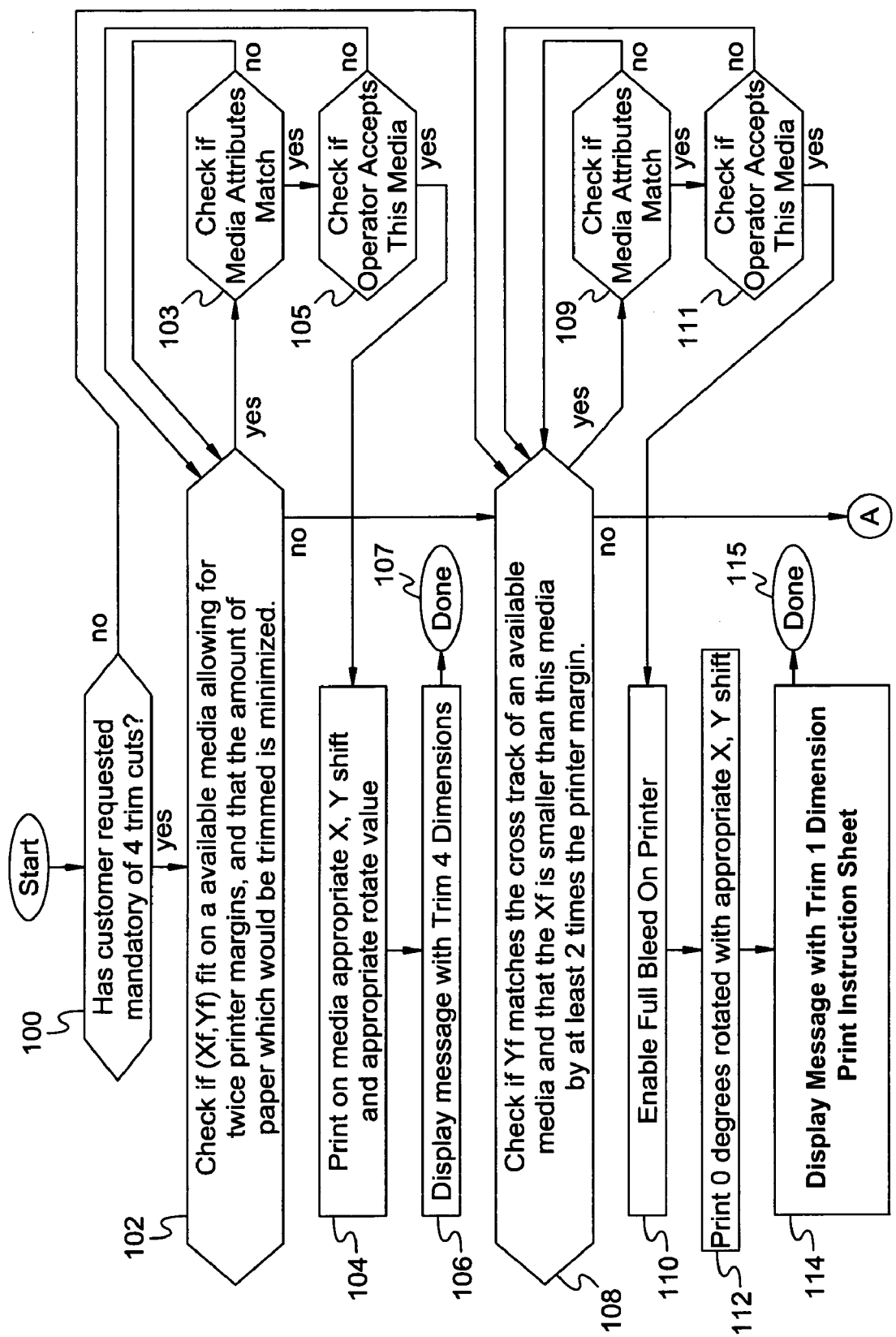
FIG. 2a and FIG. 2b is a flow diagram representing the function of the software utilized with the present invention for simplex printing.
Figure 2B:
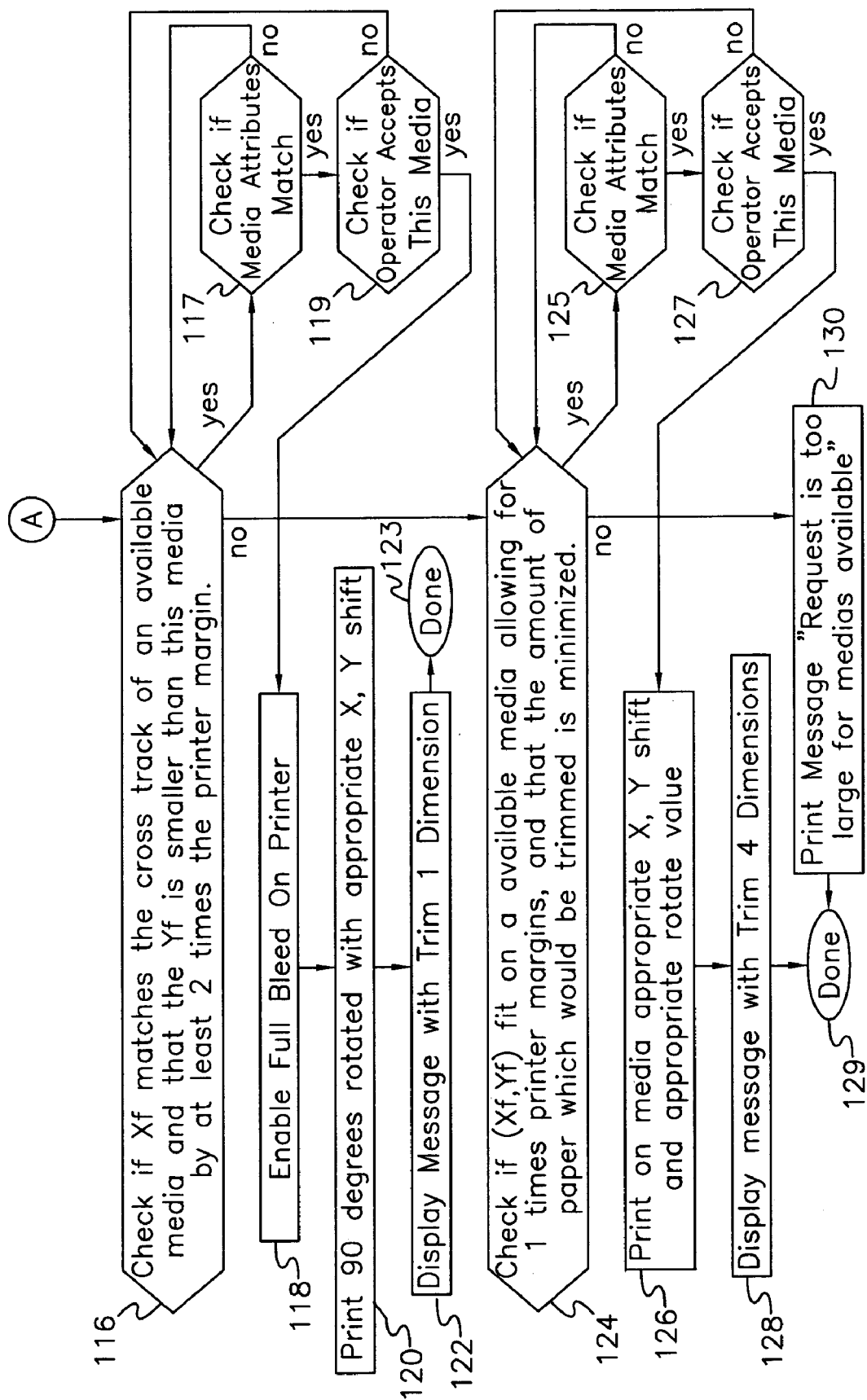
Figure 3A:
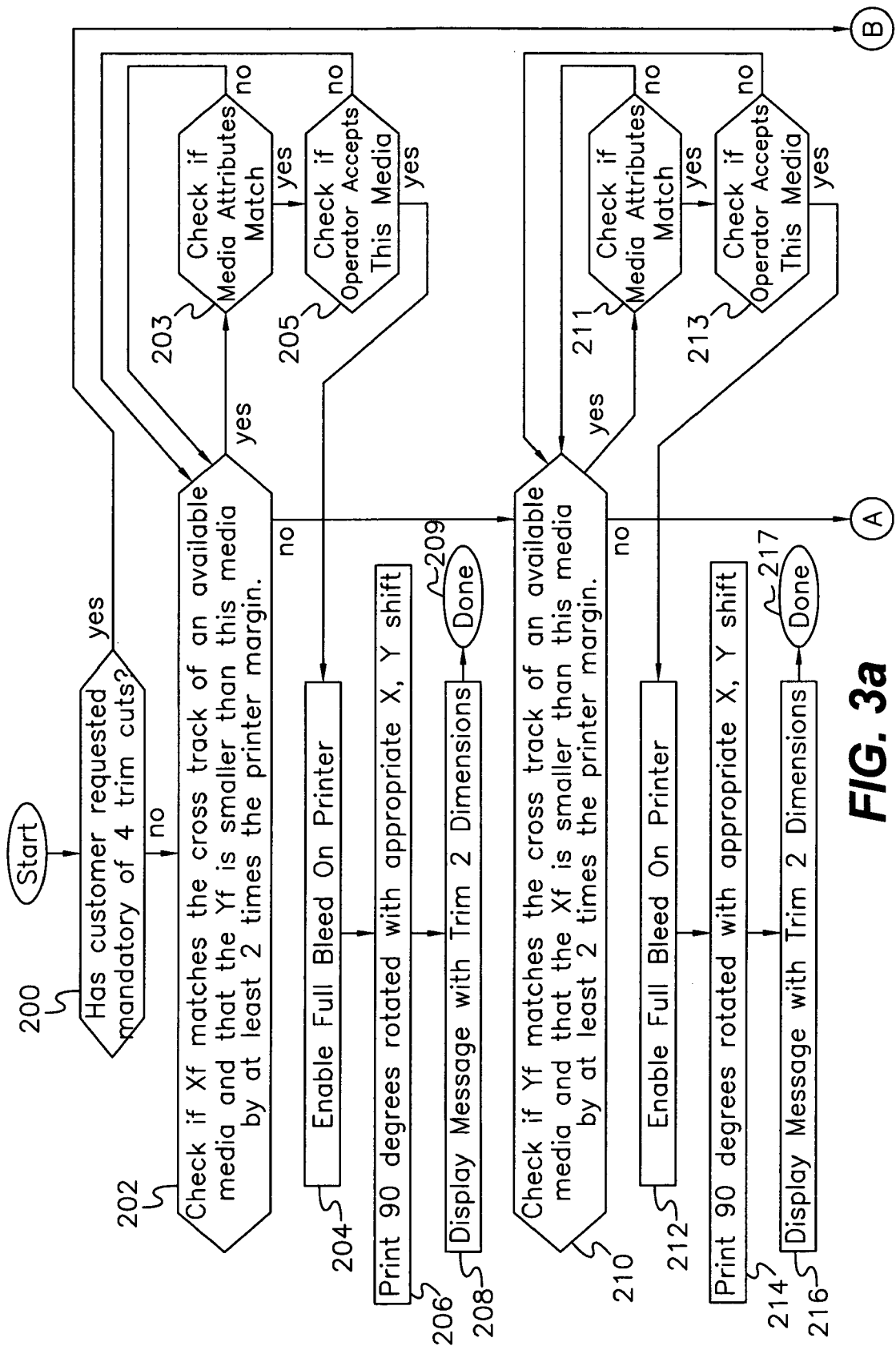
FIG. 3a and FIG. 3b is a flow diagram representing the function of the software utilized with the present invention for duplex printing.
Figure 3B:
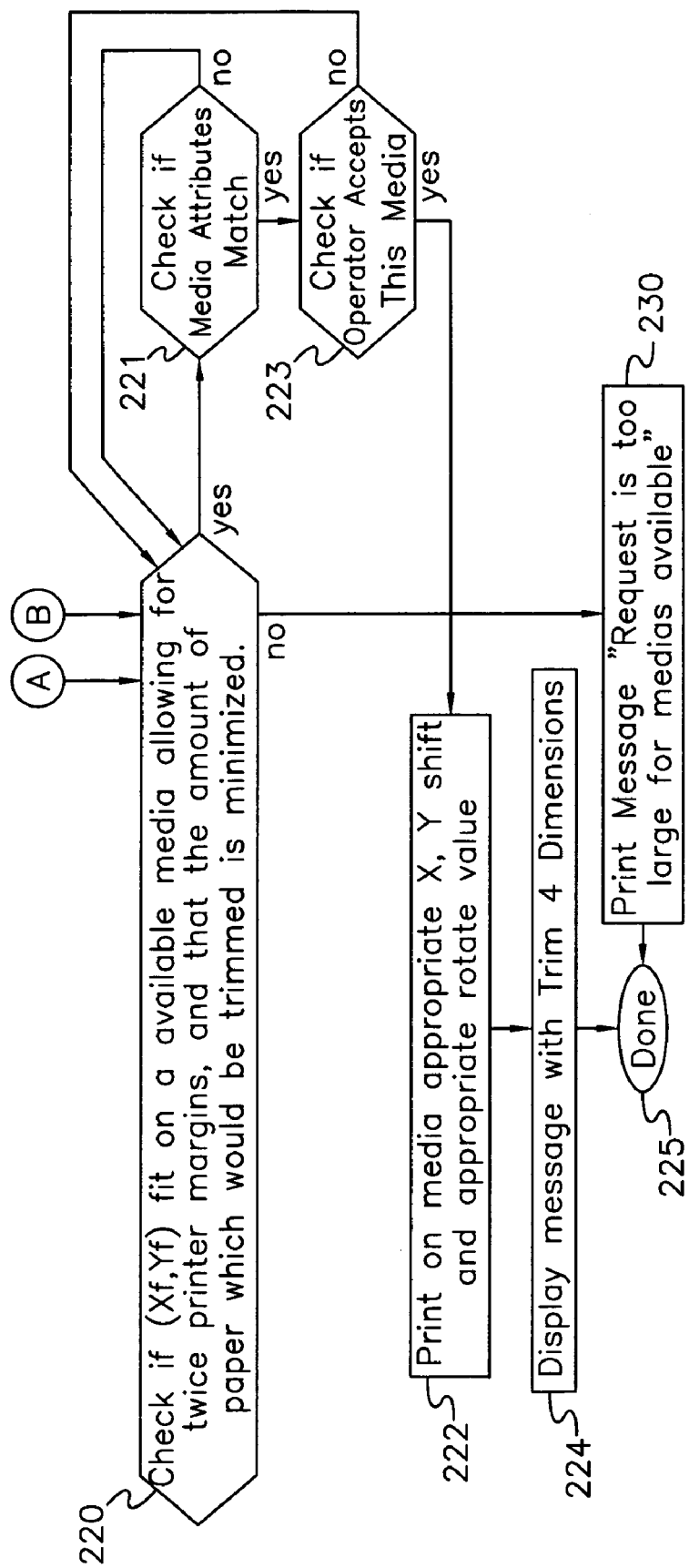

The operation of the present invention is illustrated by the flow diagrams depicted in FIGS. 2 and 3. When a print job is submitted to the printer 20 through the network 28, the print job submitter enters information specifying a number of characteristics of the print job, including the desired size of the final printer output after printing and trimming, for example 8.5"×11" or 7"×9". Additionally, the submitter enters data indicating whether the print job is to be simplex, i.e., single-sided, or duplex, i.e., double-sided. If the print job submitter selects a simplex print job, the software illustrated by the flow diagram of FIG. 2 is enabled. Alternatively, if the print job submitter selects a duplex print job, the software illustrated by the flow diagram of FIG. 3 is enabled. These alternatives are discussed in turn below and, in the following discussion, the term "Xf" denotes the desired width of the final, output paper and, likewise, "Yf" denotes the desired length of the final, output paper. Together Xf and Yf define an image area to be printed on the selected media.

Referring to FIG. 2, when the print job submitter has selected simplex printing, the method of operation of the present invention includes determining in Step 100 whether the customer has requested that all four edges of the paper be trimmed. If an affirmative response is received to Step 100, Step 102 compares the Xf and Yf dimensions to the paper available in the printer, and determines whether the area defined by Xf and Yf will fit on available media including twice the printer margin, in order to optimize the location of the image area on the media. If an affirmative response is received to Step 102, Step 103 is an inquiry to determine whether the attributes of the media other than size match the media attributes entered when the print job was setup. If an affirmative response is received to Step 103, Step 105 displays the selected media and waits until the operator enters a response before proceeding. If the operator enters a negative response to Step 105, Steps 102, 103 and 105 are repeated until the operator enters an affirmative response to Step 105, whereupon, in Step 104, the image is printed on the selected media, using the appropriate image shift and, if necessary, the appropriate image rotation value. In Step 106, a message is displayed with the instructions for trimming on the four sides of the paper. The trim instructions are generated by the raster image processor, and include the distance and direction in which the image was shifted. In a preferred embodiment, the trim instructions are also printed on a trailer page as an instruction sheet 46 that can accompany the finished print job to the off-line trimmer. In another preferred embodiment, the trimming instructions may be sent to an in-line trimming device 48 connected to the printer. The operator of the trimming device may refer to the instruction sheet when setting up the trimming device. In Step 107, the print job is allowed to continue to completion.

If a negative response is received to either Step 100 or Step 102, Step 108 is an inquiry to determine whether the cross-track dimension of any available media matches Yf and whether Xf is smaller than the leading edge of the paper by at least twice the printer margin. The term "cross-track" refers the length of the lateral edges of the paper, rather than the leading edge. If the response to Step 108 is affirmative, Step 109 is an inquiry to determine whether the attributes of the media other than size match the media attributes entered when the print job was setup. If an affirmative response is received to Step 109, Step 111 displays the selected media and waits until the operator enters a response before proceeding. If the operator enters a negative response to Step 111, Steps 108, 109 and 111 are repeated until the operator enters an affirmative response to Step 111, whereupon, Step 110 enables the printer to print "full bleed," i.e., off the edge of the page. Step 112 prints the image without rotation, but with the appropriate X,Y shift. Step 114 then displays on the printer user interface 21 a message specifying the trim directions for the one edge of the page that requires trimming. In a preferred embodiment, the trim instructions are printed on a trailer page as an instruction sheet 46 that can accompany the finished print job to the off-line trimmer. The operator of the trimming device may refer to the instruction sheet 46 when setting up the trimming device. In Step 115, the print job is allowed to continue to completion.

If the response to Step 108 is negative, Step 116 is an inquiry to determine whether Xf matches the cross-track dimension and whether Yf is smaller, by at least twice the printer margin, than the leading edge dimension of any available media. If the response to Step 116 is affirmative, Step 117 is an inquiry to determine whether the attributes of the media other than size match the media attributes entered when the print job was setup. If an affirmative response is received to Step 117, Step 119 displays the selected media and waits until the operator enters a response before proceeding. If the operator enters a negative response to Step 117, Steps 116, 117 and 119 are repeated until the operator enters an affirmative response to Step 119, whereupon, Step 118 enables the printer to print "full bleed," i.e., off the edge of the page. Step 120 rotates the image 90° and prints the image with the appropriate X,Y shift. Step 122 then displays on the printer user interface 21 a message specifying the trim directions for the one edge of the page that requires trimming. In a preferred embodiment, the trim instructions are printed on a trailer page as an instruction sheet 46 that can accompany the finished print job to the off-line trimmer. The operator of the trimming device may refer to the instruction sheet 46 when setting up the trimming device. In Step 123, the print job is allowed to continue to completion.

If the response to Step 116 is negative, Step 124 is an inquiry to determine whether Xf,Yf fits on available media, allowing for the printer margin. If the response to Step 124 is affirmative, Step 125 is an inquiry to determine whether the attributes of the media other than size match the media attributes entered when the print job was setup. If an affirmative response is received to Step 125, Step 127 displays the selected media and waits until the operator enters a response before proceeding. If the operator enters a negative response to Step 127, Steps 124, 125 and 127 are repeated until the operator enters an affirmative response to Step 127, whereupon, Step 126 prints on the selected media with the appropriate X,Y shift and, if necessary, the appropriate image rotation value. In Step 128, a message is displayed on the printer user interface 21 with the instructions for trimming on the four sides of the paper. The trim instructions are generated by the raster image processor, and include the distance and direction in which the image was shifted. In a preferred embodiment, the trim instructions are printed on a trailer page as an instruction sheet 46 that can accompany the finished print job to the off-line trimmer. The operator of the trimming device may refer to the instruction sheet 46 when setting up the trimming device. In Step 129, the print job is allowed to continue to completion.

If a negative response is received to Step 124, in Step 130 a message is displayed on the printer user interface to the effect that the "Request is too large for available media."

If the print job submitter selects duplex printing, the software illustrated by FIG. 3 is enabled. Referring to FIG. 3, Step 200 is an inquiry to determine whether the print job submitter has required that four trim cuts be made. If the response to Step 200 is affirmative, Step 220 is an inquiry to determine whether the area defined by Xf and Yf fits in available media, allowing for the printer margin. If the response to Step 220 is negative, Step 230 displays a message on the printer user interface to the effect that "Request is too large for available meida."

If the response to Step 220 is affirmative, Step 221 is an inquiry to determine whether the attributes of the media other than size match the media attributes entered when the print job was setup. If an affirmative response is received to Step 221, Step 223 displays the selected media and waits until the operator enters a response before proceeding. If the operator enters a negative response to Step 221, Steps 220, 221 and 223 are repeated until the operator enters an affirmative response to Step 223, whereupon Step 222 prints the image on the media with the appropriate X,Y shift and, if necessary, the appropriate image rotation value. In Step 224, a message is displayed on the printer user interface 21 with the instructions for trimming on the four sides of the paper. The trim instructions are generated by the raster image processor, and include the distance and direction in which the image was shifted. In a preferred embodiment, the trim instructions are, printed on a trailer page as an instruction sheet 46 that can accompany the finished print job to the off-line trimmer. The operator of the trimming device may refer to the instruction sheet 46 when setting up the trimming device. In Step 225, the print job is allowed to continue to completion.

If the response to Step 200 is negative, Step 202 is an inquiry to determine whether the cross-track dimension of any available media matches Xf and whether Yf is smaller than the leading edge of the paper by at least twice the printer margin. If the response to Step 202 is affirmative, Step 203 is an inquiry to determine whether the attributes of the media other than size match the media attributes entered when the print job was setup. If an affirmative response is received to Step 203, Step 205 displays the selected media and waits until the operator enters a response before proceeding. If the operator enters a negative response to Step 203, Steps 202, 203 and 205 are repeated until the operator enters an affirmative response to Step 205, whereupon Step 204 enables the printer to print "full bleed," i.e., off the edge of the page. Step 206 prints the image rotated 90° with the appropriate X,Y shift. Step 208 then displays on the printer user interface 21 a message specifying the trim directions for the two edges of the page that require trimming. In a preferred embodiment, the trim instructions are also printed on a trailer page as an instruction sheet 46 that can accompany the finished print job to the off-line trimmer. The operator of the trimming device may refer to the instruction sheet 46 when setting up the trimming device. In Step 209, the print job is allowed to continue to completion.

If the response to Step 202 is negative, Step 210 is an inquiry to determine whether the cross-track dimension of any available media matches Yf and whether Xf is smaller than the leading edge of the paper by at least twice the printer margin. If the response to Step 210 is affirmative, Step 211 is an inquiry to determine whether the attributes of the media other than size match the media attributes entered when the print job was setup. If an affirmative response is received to Step 211, Step 213 displays the selected media and waits until the operator enters a response before proceeding. If the operator enters a negative response to Step 211, Steps 210, 211 and 213 are repeated until the operator enters an affirmative response to Step 213, whereupon Step 212 enables the printer to print "full bleed," i.e., off the edge of the page. Step 214 prints the image without rotation, but with the appropriate X,Y shift. Step 216 then displays on the printer user interface 21 a message specifying the trim directions for the two edges of the page that require trimming. In a preferred embodiment, the trim instructions are printed on a trailer page as an instruction sheet 46 that can accompany the finished print job to the off-line trimmer. The operator of the trimming device may refer to the instruction sheet 46 when setting up the trimming device. In Step 217, the print job is allowed to continue to completion.

If the response to Step 210 is negative, Step 220 is an inquiry to determine whether the area defined by Xf and Yf fits in available media, allowing for the printer margin. If the response to Step 220 is negative, Step 230 displays a message on the printer user interface to the effect that "Request is too large for available media."

If the response to Step 220 is affirmative, Step 221 is an inquiry to determine whether the attributes of the media other than size match the media attributes entered when the print job was setup. If an affirmative response is received to Step 221, Step 223 displays the selected media and waits until the operator enters a response before proceeding. If the operator enters a negative response to Step 221, Steps 220, 221 and 223 are repeated until the operator enters an affirmative response to Step 223, whereupon Step 222 prints the image on the selected media with the appropriate X,Y shift and, if necessary, the appropriate image rotation value. In Step 224, a message is displayed on the printer user interface 21 with the instructions for trimming on the four sides of the paper. The trim instructions are generated by the raster image processor, and include the distance and direction in which the image was shifted. In a preferred embodiment, the trim instructions are printed on a trailer page as an instruction sheet 46 that can accompany the finished print job to the off-line trimmer. The operator of the trimming device may refer to the instruction sheet 46 when setting up the trimming device. Step 225 allows the print job to continue to completion.

The operation of the present invention may also be illustrated by an example, in which the customer desires a 7"×9" final printed output, i.e., Xf=7" and Yf=9", with no unprinted margins. The media available include 8.5"×11" paper in white and blue, 11"×14" in white and 11"×17" in white and blue. The operator inputs certain characteristics about the print job, including selecting blue duplex output, 7"×9" original size and fully automatic operation.

The operator enters a negative response to Step 200, and deselects "mandatory 4 trim cuts." Step 202 then compares Xf to the cross track dimensions of the available media, determining that Xf=9 does not match the cross track dimension of any available media. Step 210 then compares Yf to the cross track dimensions of the available media, and determines that Yf=7 does not match the cross track dimension of any available media. Step 210 then compares the Xf,Yf area to the available media, determines that the best fit is on 8.5"×11" media, with the image printed using a 90° rotation and a shift 0.75" toward the center of the page from the trailing edge and 1" toward the center of the page from the lateral edges, and selects 8.5"×11" white paper. Step 211 compares the attributes of the media other than size to the media attributes entered when the print job was setup, in this case determining that the "color" attribute of the automatically selected paper, i.e., white, does not match the operator-input color attribute, i.e., blue. Therefore, Step 210 is repeated, selecting the same size media, with the same shift and rotation, but in blue. Step 213 then displays the selected media and waits until the operator enters a response before proceeding. The operator reviews the selected media and enters an affirmative response to Step 213, whereupon Step 212 prints the image on the selected media with the appropriate X,Y shift and the appropriate image rotation value. In Step 214, a message is displayed on the printer user interface 21 with the instructions for trimming on the four sides of the paper and the trim instructions are printed on a trailer page as an instruction sheet 46 that can accompany the finished print job to the off-line trimmer. In another preferred embodiment, when an in-line automatic trimming device 48 is attached to the printer, the trim instructions may be sent directly to the trimmer trimming device 48, to allow trimming to be performed automatically. Step 215 allows the print job to continue to completion.

In operation, the image shift and rotation are accomplished by conventional methods well-known to those of ordinary skill in the pertinent art, for example by manipulating the raster image data. For example, in a preferred embodiment, the method is employed on a conventional copier of the type employing an endless rotating film belt from which the images are reproduced on the paper media by initiating a flash lamp to affix the toner to the paper. By varying the timing of flash with respect to the revolutions of the film belt, the image may be placed closer to or further from the leading edge of the paper media.

Additionally, the invention may be employed on a printer using a write head having a plurality of LEDs 44 that are activated to print the image on the paper. In such a configuration, the location of the image may be shifted by varying which of the LEDs 44 on the write head are activated by the write head command codes. The location of the print area on the paper media may be shifted by activating a block of LEDs 44 closer to or further away from the leading edge and/or or lateral edge of the paper media.

Finally, the image shift and rotation may be accomplished by using a print software program, such as PostScript, that directs the marking engine to build in the appropriate image shift and rotation. Such programs typically build in an image offset relative to a reference point, such on of the corners of the image area, for example.

It is to be understood that the foregoing detailed description describes presently preferred embodiments of the invention and that other alternatives, which will become apparent to those of skill in the art upon reviewing the foregoing description, are likewise intended to fall within the scope of the appended claims, including equivalents thereto.

I claim:

1. A method of automatically laying out a print job for printing on a printer having a plurality of available media sizes, the method comprising the steps of:
   a. setting up the print job, the print job comprising data denoting a print area, the print area comprising a length and a width of a finished output;
   b. determining whether the print area is smaller than an available media size by a bleed margin requirement, the bleed margin requirement being associated with a bleed margin required by the printer;
   c. automatically enabling the printer to print full-bleed;
   d. determining whether the print area must be rotated to fit the print area on an available media size while accounting for the bleed margin requirement;
   e. automatically selecting a media size from those available that accommodates the print area and the bleed margin requirement;
   f. automatically calculating the distance and direction the print area must be shifted to locate the print area on the media in such a manner as to optimize the image location on the selected media while accounting for the bleed margin requirement for efficient post-print trimming;
   g. printing the print job with the calculated image area shift and image area rotation.

2. The method of claim 1 wherein the printed output is single-sided.

3. The method of claim 1, wherein the printed output is double-sided.

4. The method of claim 1, wherein the printer is capable of full-bleed printing on four edges of the media.

5. The method of claim 1, wherein the printer is capable of full-bleed printing on three edges and requires a bleed margin on one edge of the media, and the bleed margin is automatically accounted for with the bleed margin requirement in determining the appropriate print area shift and print area rotation.

6. The method of claim 5, wherein the bleed margin is on the leading edge.

7. The method of claim 1, further comprising the steps of:
   a. printing an instruction sheet accompanying the print job that comprises trimming instructions for setting up a post-printing trimming device.

8. The method of claim 7, wherein the trimming instructions are sent to a trimming device connected to the printer.

9. The method of claim 5 wherein the printed output is single-sided.

10. The method of claim 5 wherein the printed output is double sided.

11. A method of automatically laying out a print job for printing on a printer having a plurality of available media sizes, the method comprising the steps of:
    a. setting up the print job, the print job comprising data denoting a print area, the print area comprising a length and a width of a finished output;
    b. determining whether the length of the print area is smaller than a leading edge length of an available media size and that the width of the print area is smaller than a lateral edge length of an available media size;
    c. determining whether the length of the print area is smaller than the lateral edge length of an available media size and whether the width of the print area is smaller than the trailing edge length of an available media size;
    d. enabling the printer to print full-bleed;
    e. determining whether the print area must be rotated to fit the print area on an available media size;
    f. automatically selecting a media size from the available media;
    g. automatically calculating the distance and direction the print area must be shifted to locate the print area on the media in such a manner as to optimize the image location on the media for minimizing post-print trimming;
    h. printing the print job on the printer with the calculated image area shift and image area rotation, wherein the printer is capable of full-bleed printing on three edges and requires a printer margin on one edge of the media, and the printer margin is automatically accounted for in selecting the media size and determining the appropriate print area shift and print area rotation.

12. The method of claim 11, wherein the printer is capable of full-bleed printing on four edges of the media.

13. The method of claim 11 wherein the printer margin is on the leading edge.

14. The method of claim 11, further comprising the step of:
    a. printing an instruction sheet accompanying the print job that comprises trimming instructions for setting up a post-printing trimming device.

15. The method of claim 11, further comprising the step of sending trimming instructions are comprising instructions for efficiently performing post-printing trimming to a trimming device connected to the printer.

* * * * *